UNITED STATES PATENT OFFICE 2,215,530

DEPOLARIZER FOR ELECTRIC PRIMARY CELLS AND PROCESS OF MAKING THE SAME

Ernst Nossen, Amsterdam, Netherlands

No Drawing. Application July 29, 1936, Serial No. 93,151. In Great Britain August 2, 1935

7 Claims. (Cl. 136—139)

In electric primary cells comprising an electrolyte, a positive electrode and a negative electrode, a depolariser is provided, which surrounds the positive electrode and makes it possible to maintain an electric current, while the electric circuit is closed. As a depolariser, up to now natural or artificial manganese ore has been used.

An object of my invention is a new and improved electric primary cell, which gives a higher voltage during a longer time without substantially increasing the cost of the cell.

Further objects of my invention will be apparent from the description as it proceeds.

It has been assumed that the efficiency of the depolariser is essentially due to its amount of active oxygen.

I have, however, found by experiments that not, or not only, the amount of active oxygen is responsible for the working of the depolariser, but the amount of manganic—$Mn^{III}$—ions. It is, however, not possible to provide a large amount of these ions by simply using the usual manganese ore, as this depolariser does not possess or form the ions in a sufficient quantity.

I therefore use as a depolariser a material, which possesses a high concentration of manganic—$Mn^{III}$—ions or which generates these ions by chemical reactions. Preferably, I use a material of the type: $aXO.bMnO.cMnO_2.yH_2O$ lying around a core of natural manganese ore, wherein $a$, $b$, $c$ and $y$ are numerals and X an element which can form a salt, as for example, Ca, Ba, Sr, Mg, K, Na. When the depolariser is in use in an electric primary cell, the manganous-manganite in this compound is split by hydrogen ions resulting from the reaction between the zinc and the electrolytic salt in the cell and forms manganic—$Mn^{III}$—ions according to the following equation:

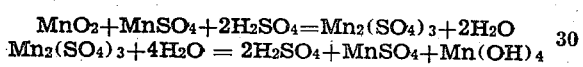

According to my invention, the depolariser is made by finely grinding manganese ore and forming manganites or poly-manganites therefrom.

According to one method of manufacture the particles of finely ground manganese ore are at least partially reduced on their surfaces and then treated with a solution and/or suspension of an oxide, hydroxide and/or carbonate of an alkali and/or of an alkaline earth, and the surplus of manganese hydroxide and of the added oxide, hydroxide and/or carbonate is removed, for example, by dissolving or by oxidising the manganese hydroxide and dissolving the added oxide.

The particles of manganese ore may be reduced by a solution of manganous salt, e. g. manganous sulphate, or by hydrochloric acid, by sulphurous acid or a mixture of these with a ferrous salt for instance ferrous sulphate, or by heating at about 200° C. in the presence of hydrogen and treating the reduced product with an acid which dissolves lower basic manganese oxides, for example sulphuric acid.

According to another feature of my invention, the particles of the finely ground manganese ore are at least partially reduced on their surfaces and then treated with a solution of a manganate or permanganate.

To make my invention more clearly understood, I give in the following some examples, but I do not wish to limit my invention to these examples:

Manganese ore is very finely ground and is boiled for about one hour in a solution of manganous salt, e. g. $MnSO_4$, the amount of manganous salt being about 15% of the manganese ore. Thereby quadrivalent manganous ions furnished by the manganese ore, react with divalent manganous salts forming trivalent manganic salts. These are not stable, but are split into manganese peroxide hydrate and manganous salt according to the following equations:

$$MnO_2 + MnSO_4 + 2H_2SO_4 = Mn_2(SO_4)_3 + 2H_2O$$
$$Mn_2(SO_4)_3 + 4H_2O = 2H_2SO_4 + MnSO_4 + Mn(OH)_4$$

Calcium hydroxide or oxide is then added in a quantity somewhat greater than necessary to react with the salt whereby manganous hydroxide is deposited which reacts with manganese peroxide hydrate forming a manganous manganite:

$$Mn(OH)_2 + Mn(OH)_4 = MnO_2.MnO.H_2O + 2H_2O$$

which contains a small amount of calcium manganite formed according to the formula:

$$2Mn(OH)_4 + Ca(OH)_2 = 2MnO_2.CaO.H_2O + 2H_2O$$

The surplus calcium hydroxide is removed by reacting it with sal ammoniac ($NH_4Cl$), whereby according, for example, to the formula $$Ca(OH)_2 + 2NH_4Cl = CaCl_2 + 2NH_4OH$$

the surplus $Ca(OH)_2$ is dissolved by adding $NH_4Cl$ in great quantities. Simultaneously the surplus of $Mn(OH)_2$, which has not reacted with the manganese peroxide hydrate, is dissolved. After this, the rest of the solution is drawn off and the material so obtained is washed, dried and divided. Instead of calcium hydroxide other materials having an alkaline effect may be used to form the manganous hydroxide; for example, KOH, NaOH, NH₄OH, MgO₂ or Ba(OH₂) may be used. In order to obtain in the manganite as small a quantity of XO as possible—XO is inefficient— the manganese peroxide hydrate may be brought into reaction with a suspension of manganous hydroxide or with a suspension of manganous oxide, which is prepared separately. According to another embodiment of my invention, the surplus $Mn(OH)_2$ is oxidized to $MnO_2$ or $Mn(OH)_4$, by an oxidizing agent, such as air, chlorine, hydrogen peroxide, or a solution of a manganate or permanganate, for instance according to the following formula:

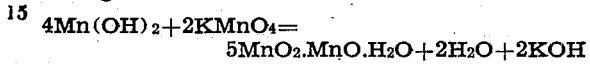

Thereby a second shell of manganites is formed around the core of natural manganese ore.

If the surplus of the X-hydroxide used is not soluble in water, the product is finally washed with a diluted acid.

The reduction of the manganese ore may also be effected by heating it at about 200° C. in the presence of hydrogen.

The reduced product is treated with an acid which dissolves lower basic manganese oxides and then further treated as described above.

If the finely ground manganese ore is comprising greater quantities of lower oxides than $MnO_2$, for example $Mn_2O_3$, $Mn_2O_4$ or/and $MnO$, it is not necessary to use another reducing agent, but these lower oxides are only to be dissolved in an acid, for example, sulphuric acid so as to form a manganous salt solution which thereby provides the required reducing agent for the ore, and the process is continued as above described.

According to another feature of my invention, since the manganic ions are very easily decomposed, means are provided in the electrolyte of the electric primary cells to protect the manganic ions, generated by the depolariser, against decomposition.

This may be done by providing an electrolyte having a high concentration of anions. Salts may be added to the electrolyte, which form protecting complex salts, for example, salts of HF, $H_3PO_4$.

The protecting salts which form the complex ions are added to the manganese ore during or after the reaction.

By my invention a sufficient quantity of manganic—$Mn^{III}$—ions is formed in an electric dry cell, according to the consumption, especially if the electric dry cell is intermittently discharged, for oxidising the hydrogen whilst the electric current flows through the cell. Moreover, a quantity of manganites or polymanganites sufficient to furnish the manganic—$Mn^{III}$—ions is formed by the core of the particles of manganese ore and the manganous salt resulting from the reduction of manganic—$Mn^{III}$—ions.

I have found that this reaction is very rapid in a cold alkaline solution, which is present in the dolly of an electric primary cell while in use and while the element X mentioned above is present. Therefore, the manganese ore may be almost completely used, whilst in an electric primary cell of the known type, only 50% of the manganese ore can be used.

The new depolariser is about 50% lighter in its specific weight and much more dispersive.

Where, in the appended claims, reference is made to the formation of manganites, it is to be understood that I intend to cover broadly the formation both of manganites and/or polymanganites.

I claim:

1. Process for manufacturing a depolarizer for electric primary cells, comprising finely grinding manganese ore; reducing the particles of said ore at least on their surface by the action of an acid solution of a manganous salt which converts the manganese ore into a trivalent manganic salt, which is decomposed by water and forms a manganous salt of said acid and manganese peroxide hydrate; forming a shell of a manganite on said reduced surfaces by reacting said manganese peroxide hydrate with an oxide selected from the group consisting of the oxides of the alkali metals, alkaline earth metals and magnesium; and removing substances detrimental for the depolarizing effect of the depolarizer.

2. A process as claimed in claim 1, in which surplus manganous hydroxide produced during the formation of the manganite in the reaction between the manganese peroxide hydrate and an oxide, is at least partially oxidized to form a second shell of manganites around the core of manganese ore.

3. A process as claimed in claim 1, in which surplus manganous hydroxide produced during the formation of the manganite in the reaction between the manganese peroxide hydrate and an oxide, is at least partially oxidized with an alkaline metal permanganate, to form a second shell of manganites around the core of manganese ore.

4. Process for manufacturing a depolarizer for electric primary cells, comprising finely grinding manganese ore; reducing the particles of said ore at least on their surface to lower manganese oxides by heat in the presence of hydrogen; converting subsequently said lower manganese oxides with an acid into a trivalent manganic salt, which is decomposed by water and forms a manganous salt of said acid and manganese peroxide hydrate; forming a shell of a manganite on said reduced surfaces by reacting said manganese peroxide hydrate with an oxide selected from the group consisting of the oxides of the alkali metals, alkaline earth metals and magnesium; and removing substances detrimental for the depolarizing effect of the depolarizer.

5. A process as claimed in claim 4, in which surplus manganous hydroxide produced during the formation of the manganite in the reaction between the manganese peroxide hydrate and an oxide, is at least partially oxidized to form a second shell of manganites around the core of manganese ore.

6. A process as claimed in claim 4, in which surplus manganous hydroxide produced during the formation of the manganite in the reaction between the manganese peroxide hydrate and an oxide, is at least partially oxidized with an alkaline metal permanganate, to form a second shell of manganites around the core of manganese ore.

7. A depolarizer for electric primary cells, comprising finely ground particles of manganese ore, said particles having a shell comprising a manganite of the formula $aXO.bMnO.cMnO_2.yH_2O$, wherein $a$, $b$, $c$ and $y$ are numerals and X is an element of the group consisting of alkaline earth metals, alkali metals and magnesium.

ERNST NOSSEN.